United States Patent
Zhou et al.

(10) Patent No.: US 8,792,215 B2
(45) Date of Patent: Jul. 29, 2014

(54) SWITCH UNIT AND POWER GENERATION SYSTEM THEREOF

(75) Inventors: Zhi-Jian Zhou, Taoyuan Hsien (TW);
Cheng Tong, Taoyuan Hsien (TW);
Peng Chen, Taoyuan Hsien (TW);
Zhen-Qing Xu, Taoyuan Hsien (TW);
Shuan-Yong Chen, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 13/528,105

(22) Filed: Jun. 20, 2012

(65) Prior Publication Data

US 2013/0235492 A1    Sep. 12, 2013

(30) Foreign Application Priority Data

Mar. 8, 2012  (CN) .......................... 2012 1 0059575

(51) Int. Cl.
*H02H 3/00*    (2006.01)
(52) U.S. Cl.
USPC ................................................ 361/8; 361/12
(58) Field of Classification Search
USPC .................................................. 361/8–12, 42
See application file for complete search history.

(56) References Cited

U.S. PATENT DOCUMENTS

| 2004/0041409 | A1* | 3/2004 | Gabrys ........................... 290/55 |
| 2008/0143462 | A1* | 6/2008 | Belisle et al. ................. 335/201 |
| 2009/0167088 | A1* | 7/2009 | Llorente Gonzalez et al. . 307/60 |
| 2010/0254046 | A1* | 10/2010 | Liu et al. ........................... 361/8 |
| 2012/0087049 | A1* | 4/2012 | Komatsu et al. ................ 361/20 |

FOREIGN PATENT DOCUMENTS

| CN | 101048592 | 10/2007 |
| CN | 102209998 | 10/2011 |
| WO | WO 2010/150389 | 12/2010 |

* cited by examiner

*Primary Examiner* — Danny Nguyen
(74) *Attorney, Agent, or Firm* — Lowe Hauptman & Ham, LLP

(57) ABSTRACT

The present disclosure provides a switch unit and a power generation system thereof. The switch unit includes a contact switch having a main contact and a control terminal, where the control terminal receives a first drive signal to turn on the contact switch; and a bi-directional controllable switch structure, which is connected in parallel to two ends of the main contact of the contact switch and receives one or more second drive signals to turn on the switch structure. When the switch unit performs a turn-off operation, the bi-directional controllable switch structure provides a commutation bypass for the contact switch, so as to protect the contact switch.

25 Claims, 7 Drawing Sheets

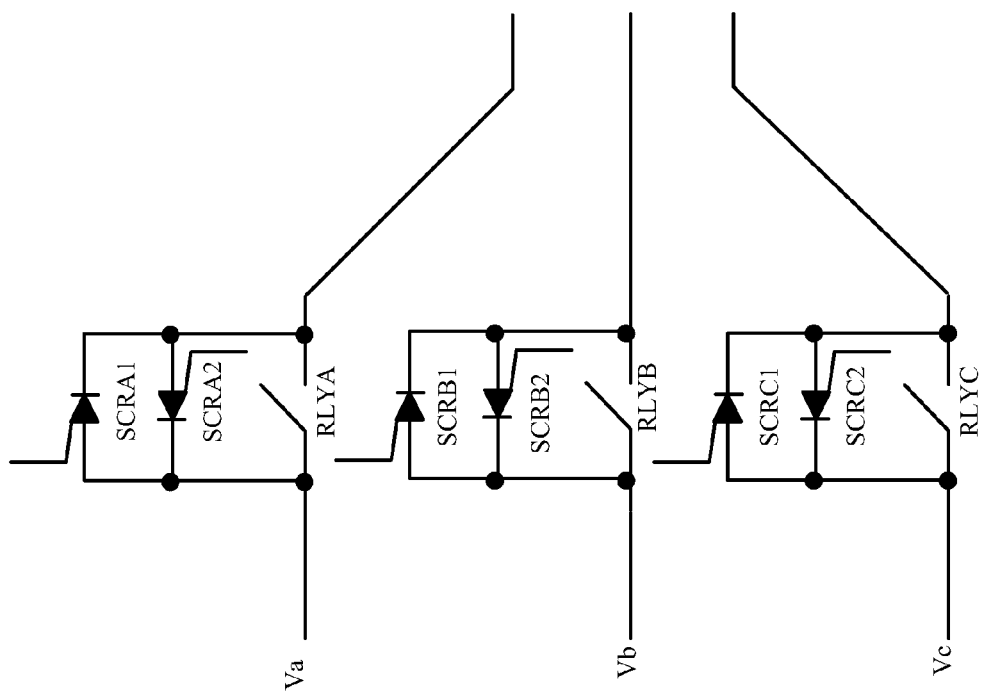

SWITCH UNIT AND POWER GENERATION SYSTEM THEREOF

RELATED APPLICATIONS

This application claims priority to Chinese Application Ser. No. 201210059575.1, filed Mar. 8, 2012, which is herein incorporated by reference.

BACKGROUND

1. Field of Invention

The present disclosure relates to power electronic technology. More particularly, the present disclosure relates to a switch unit including a contact switch.

2. Description of Related Art

With the ever-increasing seriousness of energy-related problems in recent times, the development of new ways in which to generate energy (e.g., wind energy, solar energy, etc.) is attracting the attention of those involved in research and development in various areas. In a power generation system, the amplitude and frequency of the output AC (alternating current) of the power generator is not consistent with those of the AC power grid. Therefore, the output AC power of the power generator is converted into a DC (direct current) power by means of a converter, and subsequently the DC power is inverted into another AC power which is consistent with the AC power grid in frequency and phase, so as to realize grid-connected power generation. In the process of converting the AC power into the DC power and subsequently inverting the DC power into another AC power, electronic components (e.g., power switching valves) are controlled by PWM (pulse width modulation), and the AC-DC conversion and DC-AC conversion are realized by turning on or off these power switching valves.

In a wind power generation system, for example, a traditional wind power converter is directly connected with a wind turbine or a controllable contact switch is connected in series between the wind power converter and the wind turbine. When the system fails, if the wind power converter is directly connected with the wind turbine, the rate of rotation of the wind turbine is limited in a range only by adding external loadings. For example, when the wind turbine rotates at a high speed, the voltage at the input interface of the converter is also very high. Thus, in order to protect the power components in the converter from being damaged when subjected to high voltage, typically, a set of dump loads is additionally arranged at the input interface of the wind turbine and the converter, or on the post-grade bus of a rectifier bridge, so that the voltage at the interface is reduced to an operation range which is allowed by the power component. However, since the wind turbine is directly and continuously connected with the converter, and the power of the dump loads is limited, the voltage limiting capacity of the dump loads is also limited. Furthermore, the switching response rate of the dump loads is slow, so that once the system fails unexpectedly, the reliability thereof cannot be ensured.

Furthermore, the contact switch includes a control terminal and a main contact, and the control terminal may be a coil. When an active signal (for example, power on of the coil) is provided to the control terminal, the main contact starts to operate so as to turn on the contact switch. When an invalid signal (for example, power down of the coil) is provided to the control terminal, the main contact starts to operate so as to turn off the contact switch. When the controllable series connected contact switch is used, a special arc extinction device is needed, so as to reliably cut off the electric connection between the converter and the wind turbine when a fault happens. However, such a contact switch is mostly applied to a high power-grade wind power generation system, and the cost of a contact switch having an arc extinction function is high. Additionally, if a controllable contact switch is directly used as the input switch (having no arc extinction device), since the wind turbine winding itself has a large equivalent inductance (for example, a 20 kW power generator has an equivalent inductance of about 18 mH to 40 mH), at the point in time that the switch is turned off, the energy stored by the equivalent inductance cannot be released in time, so that the generated arc voltage is loaded on two ends of the contact switch and thus the contact switch cannot operate normally or the usage life of the contact switch is reduced.

In view of this, many in the industry are endeavoring to find ways in which to design a novel switch unit, so as to quickly cut off the electric connection between the wind turbine and the converter when the system fails and thereby protect the contact switch.

SUMMARY

In order to solve the prior art problems associated with cutting off an electric connection between a power generator and a converter by a switch unit when a power generation system fails, the present disclosure provides a switch unit and a power generation system including the same.

An aspect of the present disclosure provides a power generation system including a power generator and a converter. The power generation system further includes a fault detection unit, a control unit and a switch unit. The fault detection unit detects the fault of the power generation system, and generates a fault signal when the power generation system fails. The control unit is electrically connected to the fault detection unit, so as to receive the fault signal and output a turn-off instruction. The switch unit is electrically connected to the power generator, the converter and the control unit, so as to cut off the electric connection between the power generator and the converter according to the turn-off instruction. The switch unit includes a contact switch and a bi-directional controllable switch structure. The bi-directional controllable switch structure is connected in parallel to two ends of a main contact of the contact switch. When the switch unit performs a turn-off operation, the bi-directional controllable switch structure provides a commutation bypass for the contact switch, so as to protect the contact switch.

In an embodiment, the power generation system is a wind power generation system. Furthermore, the power grade of the wind power generation system is between 10 kW and 100 kW.

In an embodiment, the turn-off instruction includes a first control signal and a second control signal. The first control signal is configured for removing a drive signal of the contact switch. The second control signal is configured for removing one or more drive signals of the bi-directional controllable switch structure, and the first control signal reaches the switch unit prior to the second control signal. Furthermore, wherein a time when the second control signal reaches the switch unit is a moment within a period from a moment of the contact switch being completely turned off to another moment before a next input voltage is on a zero-crossing. Moreover, a time interval between the point in time that the first control signal reaches the switch unit and the point in time that the second control signal reaches the switch unit is equal to or larger than an action time of the contact switch turned off completely.

In an embodiment, the bi-directional controllable switch structure is a reverse parallel circuit of a unidirectional conducting controllable switch. Moreover, the second control signal is configured for removing each drive signal of the reverse parallel unidirectional conducting controllable switch. For example, each drive signal of the reverse parallel unidirectional conducting controllable switch is removed simultaneously, and a time when the second control signal reaches the reverse parallel unidirectional conducting controllable switch is a moment within a period from a moment of the contact switch being completely turned off to another moment before a next input voltage is on a zero-crossing. Also for example, each drive signal of the reverse parallel unidirectional conducting controllable switch is removed successively, and a time when the drive signal of the unidirectional conducting controllable switch is removed subsequently is any point in time before a positive voltage is applied to the anode of the latter turned-off unidirectional conducting controllable switch.

The reverse parallel circuit of the unidirectional conducting controllable switch is a reverse parallel SCR (Silicon Controlled Rectifier). The anode and cathode of a SCR are respectively connected to the cathode and anode of another SCR, and each control terminal of the two SCRs receives a corresponding drive signal.

The reverse parallel circuit of the unidirectional conducting controllable switch is a reverse parallel IGBT (Insulated Gate Bipolar Transistor) monomer. The emitter and collector of an IGBT monomer are respectively connected to the collector and emitter of another IGBT monomer, and each gate electrode of the two IGBT monomers receives a corresponding drive signal.

The bi-directional controllable switch structure is a TRIAC.

The contact switch is a relay or a contactor.

An aspect of the present disclosure provides a switch unit including a contact switch and a bi-directional controllable switch structure. The contact switch has a main contact and a control terminal. The control terminal receives a first drive signal so as to turn on the contact switch. The bi-directional controllable switch structure is connected in parallel at the two ends of the main contact of the contact switch and receives one or more second drive signals so as to turn on the bi-directional controllable switch structure. When the switch unit performs a turn-off operation, the bi-directional controllable switch structure provides a commutation bypass for the contact switch, so as to protect the contact switch.

In an embodiment, when the switch unit performs a turn-off operation, a first control signal and a second control signal are generated. The first control signal is configured for removing the first drive signal. The second control signal is configured for removing one or more second drive signals, and the first control signal reaches the switch unit prior to the second control signal. Furthermore, a time when the second control signal reaches the switch unit is a moment within a period from a moment of the contact switch being completely turned off to another moment before a next input voltage is on a zero-crossing. Moreover, a time interval between the point in time that the first control signal reaches the switch unit and the point in time that the second control signal reaches the switch unit is equal to or larger than an action time of the contact switch turned off completely.

In an embodiment, the bi-directional controllable switch structure is a reverse parallel circuit of a unidirectional conducting controllable switch. Moreover, the second control signal is configured for removing each second drive signal of the reverse parallel unidirectional conducting controllable switch.

In an embodiment, each drive signal of the reverse parallel unidirectional conducting controllable switch is removed simultaneously, and a time when the second control signal reaches the reverse parallel unidirectional conducting controllable switch is a moment within a period from a moment of the contact switch being completely turned off to another moment before the next input voltage is on a zero-crossing.

In another embodiment, each second drive signal of the reverse parallel unidirectional conducting controllable switch is removed successively, and a time when the second drive signal of the unidirectional conducting controllable switch is removed subsequently is any point in time before a positive voltage is applied to the anode of the latter turned-off unidirectional conducting controllable switch.

The reverse parallel circuit of the unidirectional conducting controllable switch is a reverse parallel SCR. The anode and cathode of a SCR are respectively connected to the cathode and anode of another SCR, and each control terminal of the two SCRs receives a corresponding second drive signal.

The reverse parallel circuit of the unidirectional conducting controllable switch is a reverse parallel IGBT monomer. The emitter and collector of an IGBT monomer are respectively connected to the collector and emitter of another IGBT monomer, and each gate electrode of the two IGBT monomers receives a corresponding second drive signal.

The bi-directional controllable switch structure is a TRIAC.

The contact switch is a relay or a contactor.

The switch unit is applicable to a mono-phase circuit or a three-phase circuit.

By adopting the switch unit and the power generation system thereof provided by the present disclosure, the contact switch is turned on through a first drive signal, and the bi-directional controllable switch structure is turned on through one or more second drive signals. When the switch unit performs the turn-off operation, the first drive signal is initially removed through the first control signal, and subsequently the second drive signal is removed through the second control signal, so that the bi-directional controllable switch structure provides a commutation bypass for the contact switch. Therefore, when the power generation system fails the electric connection between the power generator and the converter can be quickly cut off, which increases the operation stability of the system as well as the ability to maintain a high performance thereof. Furthermore, when the bi-directional controllable switch structure provides the commutation bypass for the contact switch, the arc voltage loaded on two ends of the contact switch is effectively eliminated and the voltage of the two ends of the contact switch equals zero approximately when the contact switch is turned off, so as to protect the contact switch.

BRIEF DESCRIPTION OF THE DRAWINGS

In order to make the foregoing as well as other aspects, features, advantages, and embodiments of the present disclosure more apparent, the accompanying drawings are described as follows:

FIG. 3 (B) illustrates another specific embodiment in which each drive signal of the bi-directional controllable switch structure is removed successively according to the control timing of FIG. 2;

FIG. 7 illustrates a schematic circuit diagram in which the switch unit of FIG. 6 is applied to a three-phase circuit.

DETAILED DESCRIPTION

Figure 1:
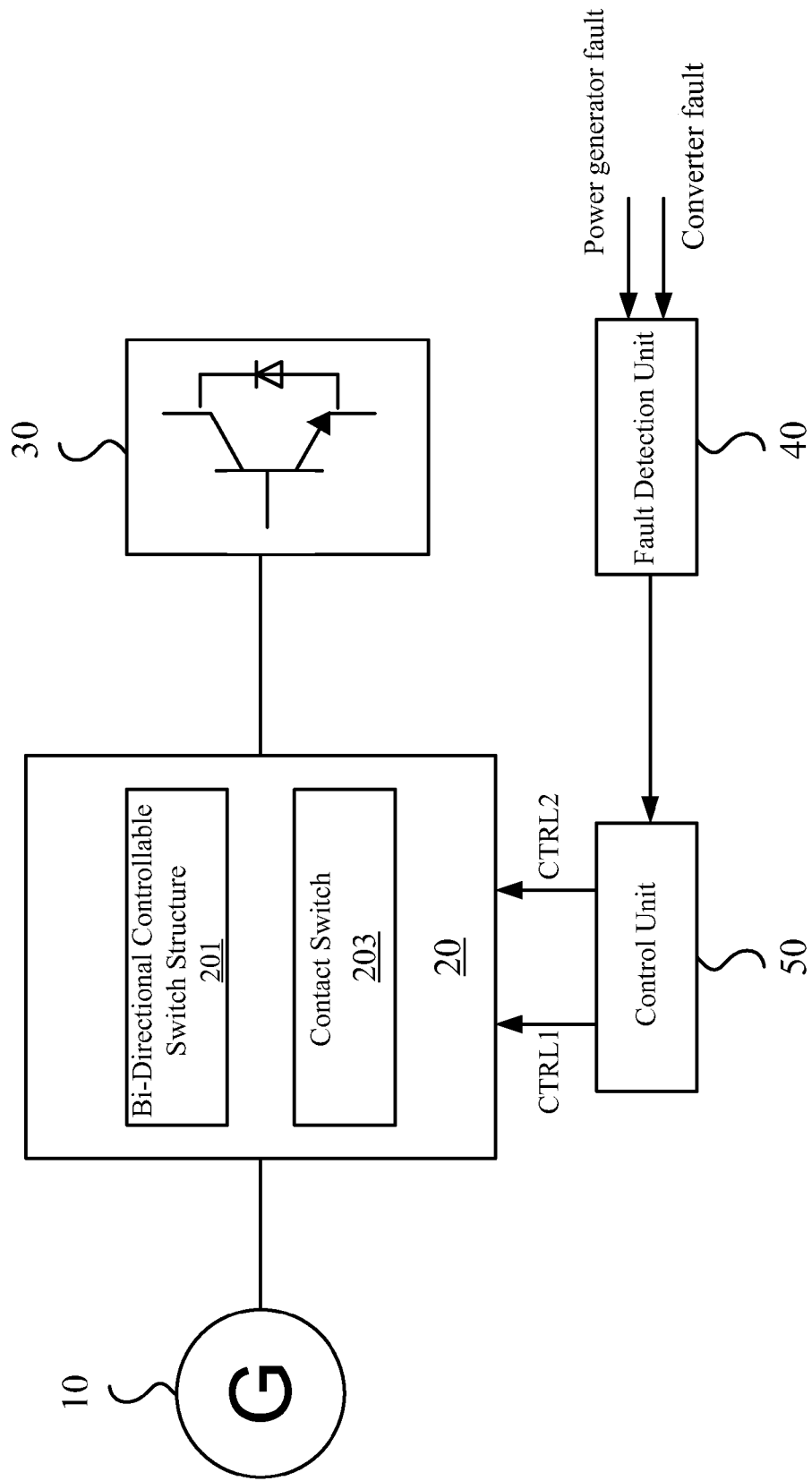
FIG. 1 illustrates a block diagram of a power generation system including a switch unit according to a specific embodiment of the present disclosure.

In order to make the technical contents of the present disclosure more detailed and more comprehensive, various embodiments of the present disclosure are described below with reference to the accompanying drawings. Wherever possible, the same reference numbers are used in the drawings and the description to refer to the same or like parts. However, those of ordinary skills in the art should understand that the embodiments described below are not used for limiting the scope of the present disclosure. Moreover, the accompanying drawings are only illustrative and are not made according to the original size.

In the embodiments and the claim of the present disclosure, the description relating to "coupled with" may refer to that a component is indirectly connected to another component through other components, and may also refer to that a component is directly connected to another component without using other components.

In the embodiments and the claim of the present disclosure, the articles "a," "an" and "the" refer to one or more, unless expressly specified otherwise.

As used herein, the terms "about", "approximately", "subsequently" or "near" are used to modify any micro-variable quantity, but these micro-variations do not change the nature of the quantity. In the embodiments the error of the quantity modified by terms "about," "approximately," "subsequently" or "near" is in a range of 20%, preferably in a range of 10%, and more preferably in a range of 5%, unless expressly specified otherwise.

FIG. 1 illustrates a block diagram of a power generation system including a switch unit according to a specific embodiment of the present disclosure.

Referring to FIG. 1, the power generation system includes a power generator 10, a switch unit 20, a converter 30, a fault detection unit 40 and a control unit 50. The fault detection unit 40 is used to detect different faults of the power generation system, and generate a fault signal when the power generation system fails. For example, the fault detection unit 40 outputs a fault signal when an over-voltage or over-current condition of the converter 30 is detected. Also for example, the fault detection unit 40 outputs a fault signal when an excessive rotational speed of the power generator 10 is detected. The control unit 50 is electrically connected with the fault detection unit 40 and the switch unit 20, so as to receive the fault signal and output a turn-off instruction to the switch unit 20. That is, when the fault detection unit 40 of the power generation system detects any fault (also referred to as an abnormal operation state), the control unit 50 outputs a turn-off instruction, so that the switch unit 20 cuts off the electric connection between the power generator 10 and the converter 30.

The switch unit 20 is electrically connected to the power generator 10, the converter 30 and the control unit 50. The switch unit 20 is configured for receiving the turn-off instruction from the control unit 50, and cuts off the electric connection between the power generator 10 and the converter 30 according to the turn-off instruction. The switch unit 20 includes a bi-directional controllable switch structure 201 and a contact switch 203. The contact switch 203 is a contactor or a relay. The bi-directional controllable switch structure 201 is connected in parallel to two ends of a main contact of the contact switch 203. When the switch unit 20 performs a turn-off operation, the bi-directional controllable switch structure 201 provides a commutation bypass for the contact switch 203, so as to protect the contact switch 203.

In a specific embodiment, the power generation system is a wind power generation system. Furthermore, the power grade of the wind power generation system is between 10 kW and 100 kW.

In another specific embodiment, the turn-off instruction sent by the control unit 50 includes a first control signal CTRL1 and a second control signal CTRL2. For example, when the contact switch 203 and the bi-directional controllable switch structure 201 of the switch unit 20 are turned on respectively through a first drive signal and one or more second drive signals, the power generation system operates normally. If the power generation system suddenly fails, the switch unit 20 can first receive the first control signal CTRL1 so as to remove the first drive signal which enables the turn-on of the contact switch 203, and can subsequently receive the second control signal CTRL2 so as to remove one or more second drive signals which enable the turn-on of the bi-directional controllable switch structure 201. When the first drive signal acted on the contact switch 203 is removed, the contact switch 203 is starts to turn off, and meanwhile since the second drive signal still acts on the bi-directional controllable switch structure 201, the bi-directional controllable switch structure 201 can provide the commutation bypass for the contact switch 203, so that when the contact switch 203 is completely turned off the voltage of the two ends of the contact switch equals zero approximately. As a result, good protection of the contact switch 203 is realized.

Figure 2:
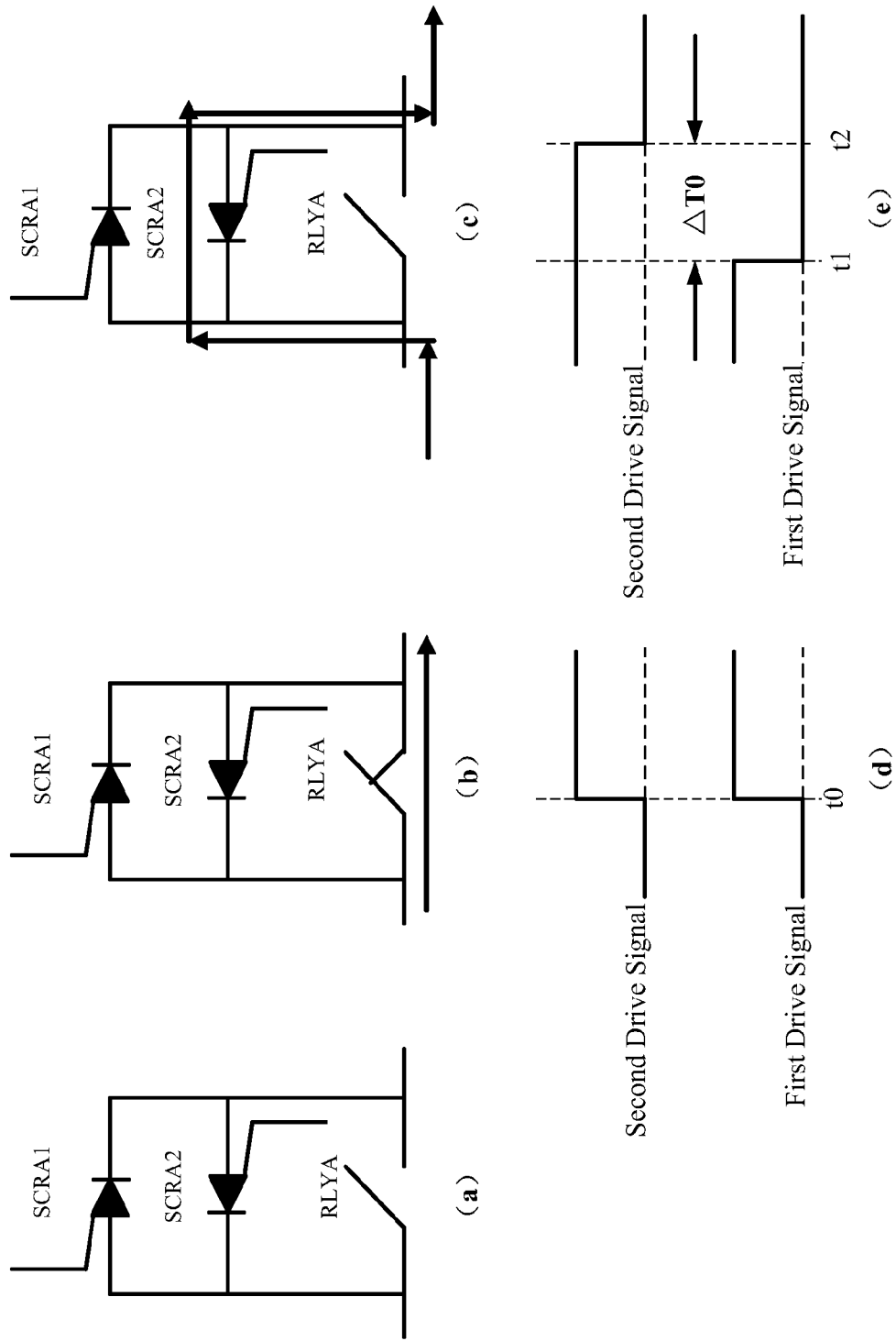
FIG. 2 illustrates a schematic view of control timing when a contact switch and a bi-directional controllable switch structure of a switch unit in the power generation system of FIG. 1 are turned on or off.

FIG. 2 illustrates a schematic view of control timing when the contact switch and the bi-directional controllable switch structure of the switch unit in the power generation system of FIG. 1 are turned on or off. More particularly, FIG. 2 (a) illustrates a schematic view in which the bi-directional controllable switch structure is connected in parallel to the contact switch. Referring to FIG. 2 (a), in an embodiment, the bi-directional controllable switch structure 201 is a reverse parallel circuit of a unidirectional conducting controllable switch. Furthermore, the second control signal CTRL2 from the control unit 50 is configured for removing each second drive signal of the reverse parallel unidirectional conducting controllable switch. For example, the reverse parallel circuit of the unidirectional conducting controllable switch is a reverse parallel SCR (silicon controlled rectifier), i.e., the SCRA1 and SCRA2 of FIG. 2 (a). The anode and cathode of the SCRA1 are respectively connected to the cathode and anode of the SCRA2, and each control terminal of the SCRA1 and SCRA2 receives a corresponding second drive signal which enables the turn-on of the SCRA1 or the SCRA2.

FIG. 2 (b) illustrates a schematic view of a current path when the bi-directional controllable switch structure and the contact switch are both turned on. FIG. 2 (d) illustrates a waveform chart of each drive signal of the bi-directional controllable switch structure and the contact switch of FIG. 2 (b). Referring to FIGS. 2 (b) and 2 (d), when the power generation system operates abnormally, the drive signals of the bi-directional controllable switch structure 201 (SCRA1 and SCRA2) and the contact switch RLYA both have an active level. For example, if the active level is high, initially the first drive signal of the contact switch RLYA is applied, and subsequently each second drive signal of the SCRA1 and SCRA2 is applied. Also for example, initially each second drive signal of the SCRA1 and SCRA2 is applied, and subsequently the first drive signal of the contact switch RLYA is applied. Still for example, each second drive signal of the SCRA1 and SCRA2, and the first drive signal of the contact switch RLYA are applied at the same time.

More particularly, when the input voltage is in the positive half cycle, a positive voltage is applied on the anode of the SCRA1 of the bi-directional controllable switch structure 201. If an active level is applied on the SCRA1, SCRA2 and RLYA at the same time, only the SCRA1 and RLYA are turned on, and meanwhile since the on-resistance of the contact switch is lower than that of the SCRA1 of the bi-directional controllable switch, the input current mainly flows through the contact switch RLYA, as shown by the direction indicated by the arrow of FIG. 2 (b). Similarly, when the input voltage is in a negative half cycle, a positive voltage is applied on the anode of the SCRA2 of the bi-directional controllable switch structure 201. If an active level is applied on the SCRA1, SCRA2 and RLYA at the same time, only the SCRA2 and the RLYA are turned on, and the input current mainly flows through the contact switch RLYA.

FIG. 2 (c) illustrates a schematic view of a current path when the contact switch of the switch unit starts to turn off. FIG. 2 (e) illustrates a waveform chart of each drive signal of the bi-directional controllable switch structure and the contact switch of FIG. 2 (c).

Referring to FIGS. 2 (c) and 2 (e), when the switch unit 20 performs the turn-off operation (i.e., cutting off the electric connection between the power generator 10 and the converter 30), the control unit 50 initially sends a first control signal CTRL1 to the switch unit 20, so as to remove the first drive signal acted on the contact switch RLYA at the point in time t1. At this time, although the contact switch RLYA is turned off, through operation of the second drive signal, the SCRA1 (or SCRA2) of the bi-directional controllable switch structure is still turned on, so that the voltage applied on two ends of the main contact of the contact switch RLYA is the on-voltage of the SCRA1 (or SCRA2), as shown in FIG. 2 (c). After a delay period $\Delta T0$, the control unit 50 sends a second control signal CTRL2 to the switch unit 20, so as to remove the second drive signal acted on the SCRA1 (or SCRA2) of the bi-directional controllable switch structure at the point in time t2. Since the contact switch RLYA and the SCRA1 (or SCRA2) of the bi-directional controllable switch structure are both turned off, the electric connection between the power generator 10 and the converter 30 is cut off. It should be pointed out that the first control signal is configured for removing the first drive signal, and the second control signal is configured for removing the second drive signal. For example, in some embodiments the first control signal and the second control signal are DISABLE signals respectively of the first drive signal and the second drive signal.

Referring to FIG. 2 (c) again, when it is necessary to cut off the electric connection between the converter 30 and the power generator 10, the drive signal acted on the contact switch RLYA is removed, so that the current originally flowing through the contact switch RLYA is diverted. That is, the input current is diverted from the contact switch RLYA to the SCRA1 or SCRA2 of the bi-directional controllable switch structure. For example, during removal of the drive signal of the contact switch, if the input voltage is in a positive half cycle, the input current is diverted from the contact switch RLYA to the SCRA1; and if the input voltage is in a negative half cycle, the input current is diverted from the contact switch RLYA to the SCRA2. During the entire current diverting process, since the SCRA1 or SCRA2 is still turned on, the voltage drop at the two ends of the main contact of the contact switch RLYA is clamped at a voltage which equals zero approximately (i.e., the on-voltage drop of the SCR). After the contact switch RLYA is completely turned off (i.e., the current is completely diverted from the RLYA to the SCRA1 or SCRA2), the drive signal acted on the SCRA1 or SCRA2 is removed, and at the point in time before a next input voltage is on the zero-crossing, the SCRA1 or SCRA2 is turned off through application of a reversed voltage. At this time, the delay time $\Delta T0$ depends on the action time required for completely turning off the main contact of the contact switch RLYA. The action time for example is generally about 10 ms according to the standard of the contact switch (e.g., the relay or contactor).

In a specific embodiment, the turn-off instruction includes a first control signal and a second control signal. The first control signal is configured for removing the drive signal of the contact switch, and the second control signal is configured for removing the drive signal of the bi-directional controllable switch structure. The first control signal reaches the switch unit prior to the second control signal. That is, when it is necessary to cut off the electric connection between the power generator 10 and the converter 30, initially the drive signal of the contact switch is removed, and subsequently the drive signal of the bi-directional controllable switch structure is removed. Furthermore, a time when the second control signal reaches the switch unit is a moment within a period from a moment of the contact switch being completely turned off to another moment before a next input voltage is on a zero-crossing. Moreover, a time interval between the point in time that the first control signal reaches the switch unit and the point in time that the second control signal reaches the switch unit is equal to or larger than the action time of the contact switch turned off completely.

Figure 3A:
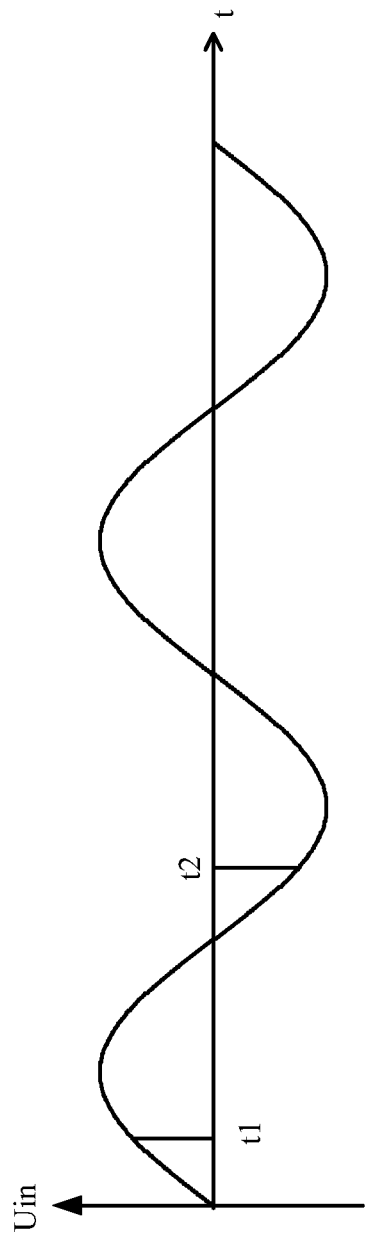
FIG. 3 (A) illustrates a specific embodiment in which each drive signal of the bi-directional controllable switch structure is removed simultaneously according to the control timing of FIG. 2.
Figure 3B:
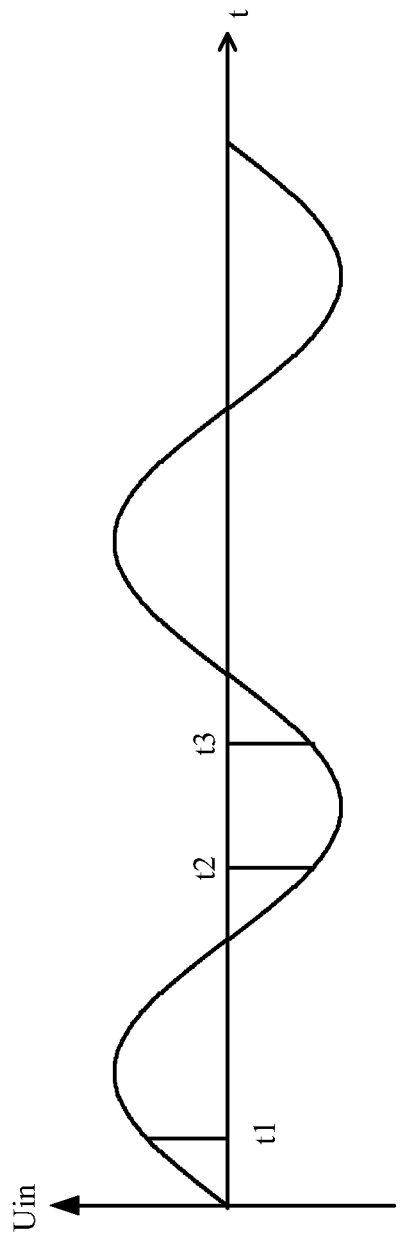

FIG. 3 (A) illustrates a specific embodiment in which each drive signal of the bi-directional controllable switch structure is removed simultaneously according to the control timing of FIG. 2.

Referring to FIG. 3 (A), the point in time t1 corresponds to the time that the contact switch is turned off. That is, at the point in time t1 the controller 50 sends a first control signal, so as to remove the first drive signal acted on the contact switch. In this embodiment, at the point in time t2, each drive signal of the reverse parallel unidirectional conducting controllable switch is removed simultaneously. A time when the second control signal reaches the reverse parallel unidirectional conducting controllable switch is a moment within a period from a moment of the contact switch being completely turned off to another moment before a next input voltage is on a zero-crossing. For example, the point in time that the contact switch is completely turned off corresponds to $t1+\Delta T0$ of FIG. 3 (A), where $\Delta T0$ is the action time of the contact switch turned off completely. Furthermore, a time when the second control signal reaches the unidirectional conducting controllable switch is before the point in time that the next input voltage is on the zero-crossing, and otherwise the unidirectional conducting controllable switch unable to be turned off.

FIG. 3 (B) illustrates another specific embodiment in which each drive signal of the bi-directional controllable switch structure is removed successively according to the control timing of FIG. 2.

Referring to FIG. 3 (B), the point in time t1 corresponds to the time that the contact switch is turned off. That is, at the point in time t1 the controller 50 sends a first control signal, so as to remove the first drive signal acted on the contact switch. The point in time t2 corresponds to the point in time that the reverse parallel unidirectional conducting controllable switch of which the drive signal is first removed is turned off, and the point in time t3 corresponds to the point in time that the unidirectional conducting controllable switch of which the drive signal is subsequently removed is turned off. In this embodiment, each drive signal of the reverse parallel unidirectional conducting controllable switch is removed successively, and a time when the drive signal of the unidirectional conducting controllable switch is removed subsequently is any point in time before a positive voltage is applied to the anode of the subsequently turned-off unidirectional conducting controllable switch. For example, the point in time t3 is in a time period of 2 ms before the voltage applied on the anode of the unidirectional conducting controllable switch is on the zero-crossing from a negative voltage to a positive voltage.

Figure 4:
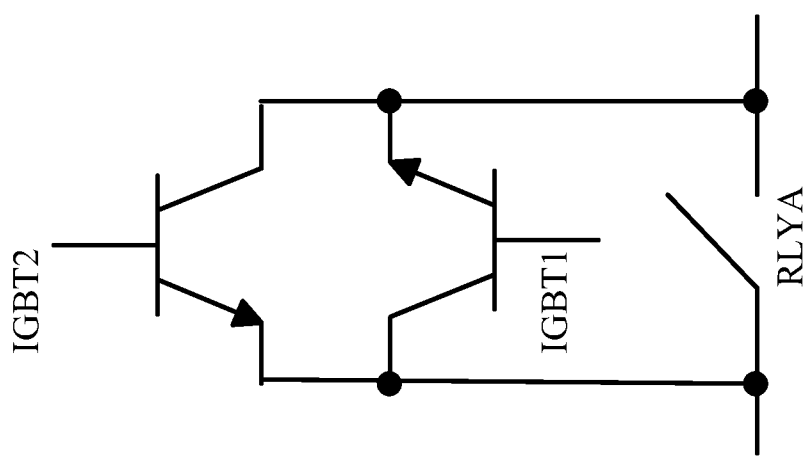
FIG. 4 illustrates a schematic circuit diagram of an embodiment of the switch unit of FIG. 1.

FIG. 4 illustrates a schematic circuit diagram of an embodiment of the switch unit of FIG. 1. Referring to FIG. 4, the reverse parallel circuit of the unidirectional conducting controllable switch is a reverse parallel IGBT (insulated gate bipolar transistor) monomer. The emitter and the collector of an IGBT1 monomer are respectively connected to the collector and the emitter of an IGBT2 monomer. Each gate electrode of the IGBT1 monomer and the IGBT2 monomer receives a corresponding second drive signal. Here, the term "IGBT monomer" refers to an IGBT which does not include a body diode, and this may be referred to herein also as a reverse parallel diode.

Figure 5:
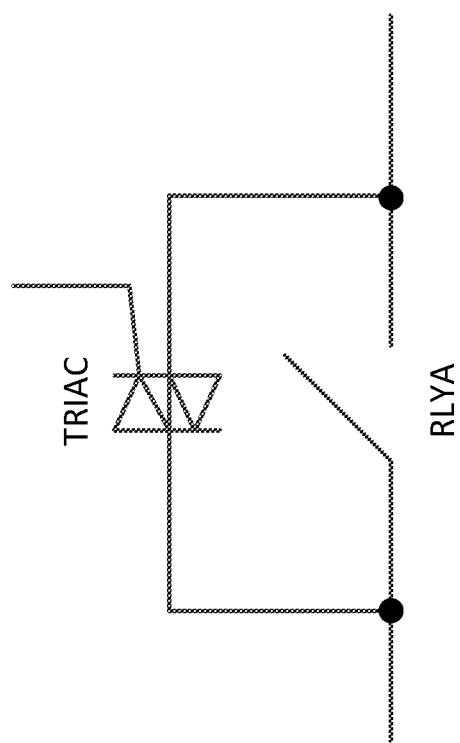
FIG. 5 illustrates a schematic circuit diagram of an embodiment of the switch unit of FIG. 1.

FIG. 5 illustrates a schematic circuit diagram of another embodiment of the switch unit of FIG. 1. Referring to FIG. 5, the bi-directional controllable switch structure is a TRIAC (TRIode AC semiconductor switch), also referred to as a bi-directional thyristor.

Figure 6:
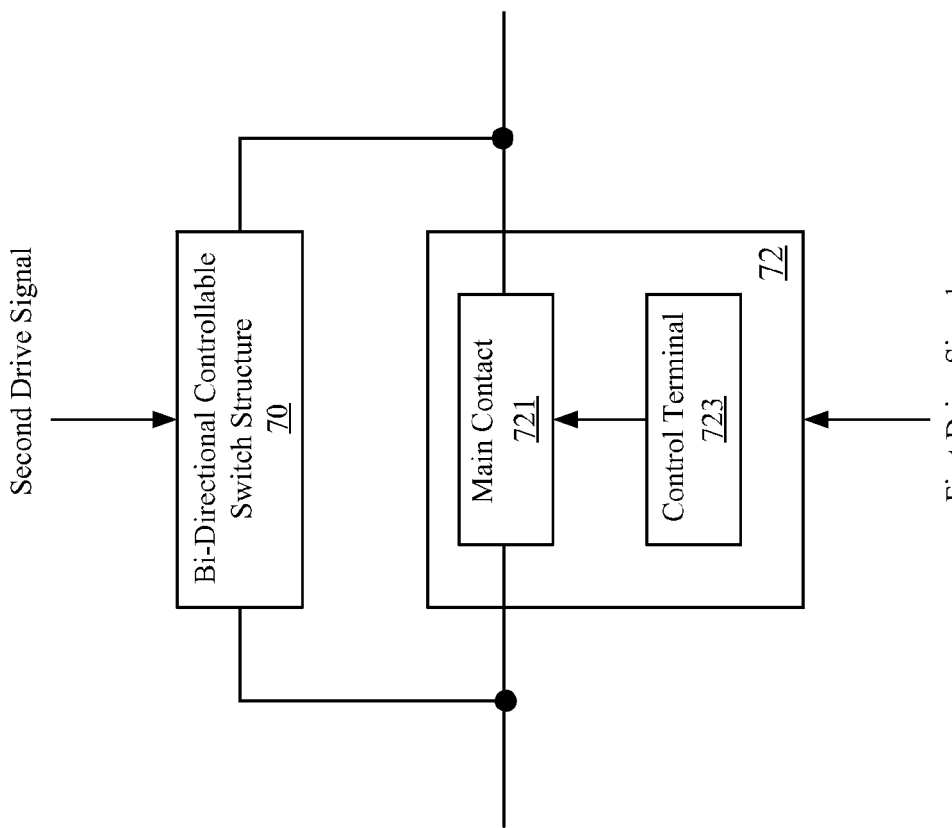
FIG. 6 illustrates a block diagram of a switch unit according to a further embodiment of the present disclosure.

FIG. 6 illustrates a block diagram of a switch unit according to a further embodiment of the present disclosure.

Referring to FIG. 6, the switch unit includes a contact switch 72 and a bi-directional controllable switch structure 70. The contact switch 72, such as the relay or contactor, has a main contact 721 and a control terminal 723. The control terminal 723 receives a first drive signal so as to turn on the contact switch 72. The bi-directional controllable switch structure 70 is connected in parallel at the two ends of the main contact 721 of the contact switch 72, and receives one or more second drive signals, so as to turn on the bi-directional controllable switch structure 70. Here, the term "bi-directional controllable switch structure" refers to a switch structure having characteristics in which when a drive signal is acted on the control terminal of the switch, the switch is turned on, and when the drive signal is removed, the switch is turned off, and is unrelated to the direction of the external voltage. When the switch unit performs a turn-off operation, the bi-directional controllable switch structure 70 provides a commutation bypass for the contact switch 72, so as to protect the contact switch 72.

In a specific embodiment, when the switch unit performs a turn-off operation, a first control signal and a second control signal are generated. The first control signal is configured for removing the first drive signal acted on the contact switch 72, and the second control signal is configured for removing one or more second drive signals acted on the bi-directional controllable switch structure 70. The first control signal reaches the switch unit prior to the second control signal. For example, a time interval between the point in time that the first control signal reaches the switch unit and the point in time that the second control signal reaches the switch unit is equal to or larger than the action time of the contact switch 72 being turned off completely.

In a specific embodiment, a time when the second control signal reaches the bi-directional controllable switch structure 70 of the switch unit is a moment within a period from a moment of the contact switch 72 is completely turned off to another moment before a next input voltage is on a zero-crossing.

In another specific embodiment, the bi-directional controllable switch structure 70 is a reverse parallel circuit of a unidirectional conducting controllable switch. Moreover, the second control signal is configured for removing each second drive signal of the reverse parallel unidirectional conducting controllable switch. For example, each second drive signal of the reverse parallel unidirectional conducting controllable switch may be removed simultaneously, and a time when the second control signal reaches the reverse parallel unidirectional conducting controllable switch is a moment within a period from a moment of the contact switch 72 being completely turned off to another moment before the next input voltage is on the zero-crossing. Also for example, each second drive signal of the reverse parallel unidirectional conducting controllable switch may be removed successively, and a time when the second drive signal of the unidirectional conducting controllable switch is removed subsequently is any point in time before a positive voltage is applied to the anode of the latter turned-off unidirectional conducting controllable switch. Preferably, a time when the second drive signal of the unidirectional conducting controllable switch is removed subsequently is in a time period of 2 ms before the voltage applied on the anode of the unidirectional conducting controllable switch is on the zero-crossing from a negative voltage to a positive voltage.

Furthermore, the reverse parallel circuit of the unidirectional conducting controllable switch may be a reverse parallel SCR. The anode and cathode of a SCR is connected to the cathode and anode of another SCR, and each control terminal of the two SCRs receives a corresponding second drive signal.

Furthermore, the reverse parallel circuit of the unidirectional conducting controllable switch may be a reverse parallel IGBT monomer. The emitter and collector of an IGBT monomer are connected to the collector and emitter of another IGBT monomer. Each gate electrode of the two IGBT monomers receives a corresponding second drive signal.

Moreover, the bi-directional controllable switch structure 70 is a TRIAC.

FIG. 7 illustrates a schematic circuit diagram in which the switch unit of FIG. 6 is applied to a three-phase circuit.

It should be understood that the switch unit of FIG. 6 is not only applicable to a mono-phase circuit, but also applicable to a three-phase circuit. Referring to FIG. 7, in a three-phase circuit where the input voltages are respectively Va, Vb and Vc, a switch unit is arranged in each phase, so as to protect the contact switch. For example, in phase A the switch unit of the circuit includes the contact switch RLYA and the bi-directional controllable switch structure connected in parallel to the contact switch RLYA, and the bi-directional controllable switch structure includes reverse parallel SCRA1 and SCRA2. Similarly, in phase B the switch unit of the circuit includes the contact switch RLYB and the bi-directional controllable switch structure connected in parallel to the contact switch RLYB, and the bi-directional controllable switch structure includes reverse parallel SCRB1 and SCRB2. In phase C the switch unit of the circuit includes the contact switch RLYC and the bi-directional controllable switch structure connected in parallel to the contact switch RLYC, and the bi-directional controllable switch structure includes reverse parallel SCRC1 and SCRC2.

By adopting the switch unit and the power generation system thereof provided by the present disclosure, the contact switch is turned on through a first drive signal, and the bi-directional controllable switch structure is turned on through a second drive signal. When the switch unit performs the turn-off operation, the first drive signal is initially removed through the first control signal, and subsequently the second drive signal is removed through the second control signal, so that the bi-directional controllable switch structure provides a commutation bypass for the contact switch. Therefore, when the power generation system fails the electric connection between the power generator and the converter can be quickly cut off, which increases the operation stability of the system as well as the ability to maintain a high performance thereof. Furthermore, when the bi-directional controllable switch structure provides the commutation bypass for the contact switch, the arc voltage loaded on two ends of the contact switch is effectively eliminated and the voltage equals zero approximately when the contact switch is turned off, so as to protect the contact switch.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. A power generation system comprising a power generator and a converter, wherein the power generation system further comprises:
    a fault detection unit for detecting the fault of the power generation system and generating a fault signal when the power generation system fails;
    a control unit electrically connected to the fault detection unit, so as to receive the fault signal and output a turn-off instruction; and
    a switch unit electrically connected to the power generator, the converter and the control unit, so as to cut off the electric connection between the power generator and the converter according to the turn-off instruction,
    wherein the switch unit comprises a contact switch and a bi-directional controllable switch structure, the bi-directional controllable switch structure is connected in parallel to two ends of a main contact of the contact switch, and when the switch unit performs a turn-off operation, the bi-directional controllable switch structure provides a commutation bypass for the contact switch so as to protect the contact switch,
    wherein the turn-off instruction includes a first control signal and a second control signal, and wherein the first control signal is configured for removing a drive signal of the contact switch, the second control signal is configured for removing one or more drive signals the bi-directional controllable switch structure, and the first control signal reaches the switch unit prior to the second control signal.

2. The power generation system of claim 1, wherein the power generation system is a wind power generation system.

3. The power generation system of claim 2, wherein the power grade of the wind power generation system is between 10 kW and 100 kW.

4. The power generation system of claim 1, wherein a time when the second control signal reaches the switch unit is a moment within a period from a moment of the contact switch being completely turned off to another moment before a next input voltage is on a zero-crossing.

5. The power generation system of claim 1, wherein a time interval between the point in time that the first control signal reaches the switch unit and the point in time that the second control signal reaches the switch unit is equal to or larger than an action time of the contact switch turned off completely.

6. The power generation system of claim 1, wherein the bi-directional controllable switch structure is a reverse parallel circuit of a unidirectional conducting controllable switch.

7. The power generation system of claim 6, wherein the second control signal is configured for removing each drive signal of the reverse parallel unidirectional conducting controllable switch.

8. The power generation system of claim 7, wherein each drive signal of the reverse parallel unidirectional conducting controllable switch is removed simultaneously, and a time when the second control signal reaches the reverse parallel unidirectional conducting controllable switch is a moment within a period from a moment of the contact switch is completely turned off to another moment before the next input voltage is on a zero-crossing.

9. The power generation system of claim 7, wherein each drive signal of the reverse parallel unidirectional conducting controllable switch is removed successively, and a time when the drive signal of the unidirectional conducting controllable switch is removed subsequently is any point in time before a positive voltage is applied to the anode of the latter turned-off unidirectional conducting controllable switch.

10. The power generation system of claim 6, wherein the reverse parallel circuit of the unidirectional conducting controllable switch is a reverse parallel SCR (Silicon Controlled Rectifier), the anode and cathode of a SCR are respectively connected to the cathode and anode of another SCR, and each control terminal of the two SCRs receives a corresponding drive signal.

11. The power generation system of claim 6, wherein the reverse parallel circuit of the unidirectional conducting controllable switch is a reverse parallel IGBT (Insulated Gate Bipolar Transistor) monomer, the emitter and collector of an IGBT monomer are respectively connected to the collector and emitter of another IGBT monomer, and each gate electrode of the two IGBT monomers receives a corresponding drive signal.

12. The power generation system of claim 1, wherein the bi-directional controllable switch structure is a TRIAC.

13. The power generation system of claim 1, wherein the contact switch is a relay or a contactor.

14. A switch unit, comprising:
    a contact switch having a main contact and a control terminal, wherein the control terminal receives a first drive signal so as to turn on the contact switch; and
    a bi-directional controllable switch structure connected in parallel at the two ends of the main contact of the contact switch and receiving one or more second drive signals so as to turn on the bi-directional controllable switch structure,
    wherein when the switch unit performs a turn-off operation, the bi-directional controllable switch structure provides a commutation bypass for the contact switch, so as to protect the contact switch, and wherein when the switch unit performs the turn-off operation, a first control signal and a second control signal are generated, and wherein the first control signal is configured for removing the first drive signal, the second control signal is configured for removing one or more second drive signals, and the first control signal reaches the switch unit prior to the second control signal.

15. The switch unit of claim 14, wherein a time when the second control signal reaches the switch unit is a moment within a period from a moment of the contact switch being completely turned off to another moment before a next input voltage is on a zero-crossing.

16. The switch unit of claim 14, wherein a time interval between the point in time that the first control signal reaches the switch unit and the point in time that the second control signal reaches the switch unit is equal to or larger than an action time of the contact switch turned off completely.

17. The switch unit of claim 14, wherein the bi-directional controllable switch structure is a reverse parallel circuit of a unidirectional conducting controllable switch.

18. The switch unit of claim 17, wherein the second control signal is configured for removing each second drive signal of the reverse parallel unidirectional conducting controllable switch.

19. The switch unit of claim 18, wherein each second drive signal of the reverse parallel unidirectional conducting controllable switch is removed simultaneously, and a time when the second control signal reaches the reverse parallel unidirectional conducting controllable switch is a moment within a period from a moment of the contact switch being completely turned off to another moment before a next input voltage is on a zero-crossing.

20. The switch unit of claim 18, wherein each second drive signal of the reverse parallel unidirectional conducting controllable switch is removed successively, and a time when the second drive signal of the unidirectional conducting controllable switch is removed subsequently is any point in time before a positive voltage is applied to the anode of the latter turned-off unidirectional conducting controllable switch.

21. The switch unit of claim 17, wherein the reverse parallel circuit of the unidirectional conducting controllable switch is a reverse parallel SCR, the anode and cathode of a SCR are respectively connected to the cathode and anode of another SCR, and each control terminal of the two SCRs receives a corresponding second drive signal.

22. The switch unit of claim 17, wherein the reverse parallel circuit of the unidirectional conducting controllable switch is a reverse parallel IGBT monomer, the emitter and collector of an IGBT monomer are respectively connected to the collector and emitter of another IGBT monomer, and each gate electrode of the two IGBT monomers receives a corresponding second drive signal.

23. The switch unit of claim 14, wherein the bi-directional controllable switch structure is a TRIAC.

24. The switch unit of claim 14, wherein the contact switch is a relay or a contactor.

25. The switch unit of claim 14, wherein the switch unit is applicable to a mono-phase circuit or a three-phase circuit.

\* \* \* \* \*